United States Patent
Yanagawa et al.

(10) Patent No.: US 12,469,874 B2
(45) Date of Patent: Nov. 11, 2025

(54) SOLID ELECTROLYTE BODY, ALL-SOLID-STATE BATTERY, METHOD FOR PRODUCING SOLID ELECTROLYTE BODY, AND METHOD FOR PRODUCING ALL-SOLID-STATE BATTERY

(71) Applicant: JAPAN FINE CERAMICS CO., LTD., Sendai (JP)

(72) Inventors: Masaki Yanagawa; Akira Hatakeyama, Miyagi (JP); Hitoshi Takamura, Miyagi (JP)

(73) Assignee: Japan Fine Ceramics Co., Ltd., Miyagi (JP)

( * ) Notice: Subject to any disclaimer, the term of this patent is extended or adjusted under 35 U.S.C. 154(b) by 169 days.

(21) Appl. No.: 16/964,438

(22) PCT Filed: Feb. 7, 2019

(86) PCT No.: PCT/JP2019/004495
§ 371 (c)(1),
(2) Date: Jul. 23, 2020

(87) PCT Pub. No.: WO2019/156187
PCT Pub. Date: Aug. 15, 2019

(65) Prior Publication Data
US 2021/0050622 A1 Feb. 18, 2021

(30) Foreign Application Priority Data
Feb. 8, 2018 (JP) .................. 2018-021439

(51) Int. Cl.
*H01M 4/80* (2006.01)
*H01M 10/0562* (2010.01)

(52) U.S. Cl.
CPC .......... *H01M 10/0562* (2013.01); *H01M 4/80* (2013.01); *H01M 2300/0074* (2013.01)

(58) Field of Classification Search
CPC .......... H01M 4/62; H01M 4/80; H01M 4/139; H01M 4/661; H01M 4/664; H01M 4/666;
(Continued)

(56) References Cited

U.S. PATENT DOCUMENTS 7,824,795 B2  11/2010  Yoshida et al.
8,309,257 B2  11/2012  Kanamura et al.
(Continued)

FOREIGN PATENT DOCUMENTS

CN  104916869 A  *  9/2015
JP  2006-339034 A     12/2006
(Continued)

OTHER PUBLICATIONS

JP2006339034A machine English translation of document, Himeko Orui, et al., "Solid oxide fuel cell, and method of manufacturing same", Date: Apr. 29, 2022, retrieved from https://worldwide.espacenet.com (Year: 2006).*
(Continued)

*Primary Examiner* — Matthew T Martin
*Assistant Examiner* — Jared Hansen
(74) *Attorney, Agent, or Firm* — Carrier, Shende & Associates P.C.; Joseph P. Carrier; Fulchand P. Shende

(57) ABSTRACT

Provided is a method for easily producing a thin-membrane solid electrolyte body. A molded body (11) of a first ceramic is prepared, and the molded body (11) is fired in a first temperature range to prepare a porous body (110). A thin membrane-shaped molded body (12) composed of a second ceramic containing a solid electrolyte is prepared on at least a part of a surface of the porous body (110). A dense body (120) is prepared by firing the thin membrane-shaped molded body (12). As a result, a solid electrolyte body (1) including the porous body (110) as a support and the dense body (120) of a thin membrane-shaped electrolyte integrally
(Continued)

formed with at least a part of the surface of the porous body (110), is produced.

9 Claims, 3 Drawing Sheets

(58) Field of Classification Search
CPC ............ H01M 4/0416; H01M 4/0433; H01M 4/0471; H01M 4/1391; H01M 10/052; H01M 10/0562; H01M 10/0585; H01M 2300/0065; H01M 2300/0074; H01M 2300/0091; Y02E 60/10; Y02P 70/50
See application file for complete search history.

(56) References Cited

U.S. PATENT DOCUMENTS

| | | | |
|---|---|---|---|
| 2007/0065701 A1* | 3/2007 | Cable | C04B 35/486 429/495 |
| 2009/0226816 A1* | 9/2009 | Yoshida | C04B 35/447 264/610 |
| 2010/0143824 A1* | 6/2010 | Tucker | H01M 8/124 429/479 |
| 2013/0171527 A1* | 7/2013 | Lanning | H01M 4/861 429/405 |
| 2014/0030604 A1* | 1/2014 | Laor | H01M 4/806 429/235 |
| 2014/0216632 A1* | 8/2014 | Ichikawa | H01M 4/0471 264/618 |
| 2015/0111110 A1 | 4/2015 | Watanabe et al. | |
| 2017/0077476 A1* | 3/2017 | Kitoh | H01M 10/28 |
| 2017/0179472 A1* | 6/2017 | Allie | H01M 10/052 |
| 2017/0229697 A1* | 8/2017 | Hayashi | H01M 10/30 |

FOREIGN PATENT DOCUMENTS

| | | |
|---|---|---|
| JP | 2008-226666 A | 9/2008 |
| JP | 2008235076 A * | 10/2008 |
| JP | 2009-181920 A | 8/2009 |
| JP | 2009-238739 A | 10/2009 |
| JP | 2009-259746 A | 11/2009 |
| JP | 5281896 B2 | 9/2013 |
| JP | 2013-232284 A | 11/2013 |
| KR | 101405755 B1 * | 6/2014 |
| WO | 2008/059987 A1 | 5/2008 |

OTHER PUBLICATIONS

KR101405755b1, Ryu et al., "Metal air battery" retrieved from https://worldwide.espacenet.com/ Date: Feb. 3, 2023 (Year: 2014).*

CN104916869a, Ren, et al., "Porous-compact double-layer electrolyte ceramic sintered body, lithium ion battery and lithium-air battery", machine English translation retrieved from https://worldwide.espacenet.com/ Date: Dec. 14, 2023 (Year: 2015).*

Vitorino, et al., "Porous/dense YSZ layers for prospective SOFC processing", CIMTEC 2014—6th Forum of New Materials (2014) ( Year: 2014).*

JP2008235076A, Yoshida, et al. "Manufacturing method of ceramic structure", machine English translation retrieved from https://worldwide.espacenet.com/ Date: Mar. 17, 2025 (Year: 2008).*

Office Action dated Jun. 24, 2024 issued in the corresponding Korean Patent Application No. 10-2020-7022629 with the English machine translation thereof.

* cited by examiner

SOLID ELECTROLYTE BODY, ALL-SOLID-STATE BATTERY, METHOD FOR PRODUCING SOLID ELECTROLYTE BODY, AND METHOD FOR PRODUCING ALL-SOLID-STATE BATTERY

TECHNICAL FIELD

The present invention relates to a method for producing a solid electrolyte body and a method for producing an all-solid state battery in which the solid electrolyte body is used.

BACKGROUND ART

A method for producing a solid electrolyte body for an all-solid state battery has been proposed (see Patent Literature 1). Specifically, a first molded body is obtained by molding a first ceramic material containing a solid electrolyte (for example, $Li_3PO_4$, LiPON, $Li_2S$—$SiS_2$, $Li_2S$—$P_2S_5$, $Li_2S$—$B_2S_3$ etc.) into a plate shape, and a dense body is formed by firing the first molded body. A second molded body is obtained by applying a second ceramic material containing a solid electrolyte that is the same as or different from the solid electrolyte forming the dense body to one surface of the dense body, and the second molded body is additionally fired together with the dense body at a temperature lower than the firing temperature of the first molded body to form on at least one surface of the dense body a porous layer integrated by firing.

CITATION LIST

Patent Literature

Patent Literature 1: Japanese Patent No. 5281896

SUMMARY OF INVENTION

Technical Problem

According to the prior art described above, a first molded body is obtained by a pressing method, a doctor blade method, a reverse roll coater method, or the like, and a solid electrolyte having a dense body with a thickness of 5 µm to 100 µm is obtained. However, in actual practice, although it is not impossible to prepare an individual solid electrolyte having a thin dense body with a thickness of, for example, 100 µm or less, such a solid electrolyte is very difficult to produce because of cracking that can arise as a result of the insufficient strength of the solid electrolyte due to its own thinness.

Therefore, it is an object of the present invention to provide a method for producing a solid electrolyte body while facilitating the preparation of a solid electrolyte having a thin dense body, a method for producing an all-solid state battery, and the like.

Solution to Problem

The present invention relates to a method for producing a solid electrolyte body comprising a porous body composed of a first ceramic, and a dense body containing a thin membrane-shaped solid electrolyte composed of a second ceramic containing a solid electrolyte and integrally formed with at least a part of a surface of the porous body.

The method for producing the solid electrolyte body of the present invention comprises a step of preparing the porous body by preparing a first molded body and firing the first molded body, and a step of preparing a thin membrane-shaped second molded body of the ceramics on at least a part of the surface of the porous body, and preparing the dense body containing the solid electrolyte by firing the second molded body.

A method for producing an all-solid state battery according to the present invention is characterized by comprising a step of producing the solid electrolyte body by the method for producing a solid electrolyte body according to the present invention, and a step of filling open pores of the porous body forming the solid electrolyte body with an active material, which is an electrode.

Advantageous Effect of Invention

According to the method for producing a solid electrolyte body and the method for producing an all-solid state battery of the present invention, a thin membrane-shaped second molded body is formed on at least a part of the surface of a porous body prepared in advance, and a dense body containing a thin membrane-shaped solid electrolyte is prepared by firing the second molded body. Therefore, it is possible to produce a solid electrolyte body and an all-solid state battery while facilitating the production of a thin dense body.

DESCRIPTION OF EMBODIMENTS (Structure of Solid Electrolyte Body)

Figure 1A:
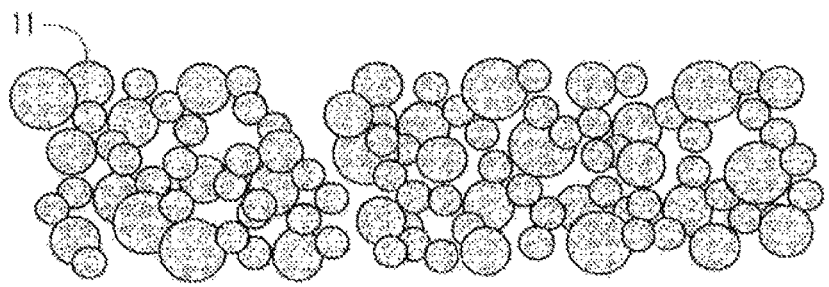
FIG. 1A is an explanatory diagram relating to a step of preparing a first molded body.
Figure 1B:
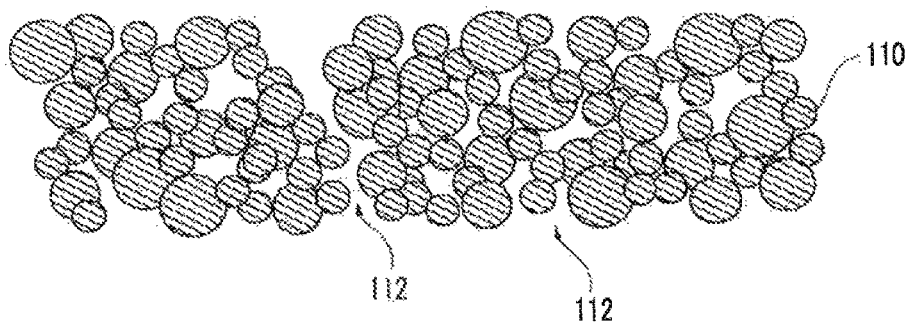
FIG. 1B is an explanatory diagram relating to a step of preparing a porous body.
Figure 1C:
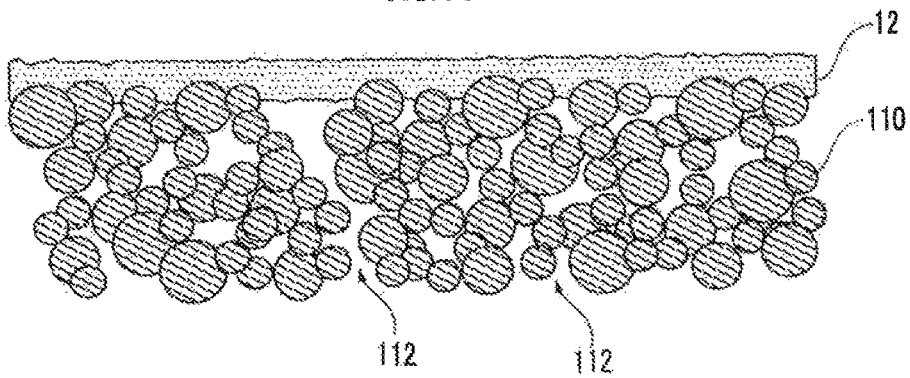
FIG. 1C is an explanatory diagram relating to a step of preparing a second molded body.
Figure 1D:
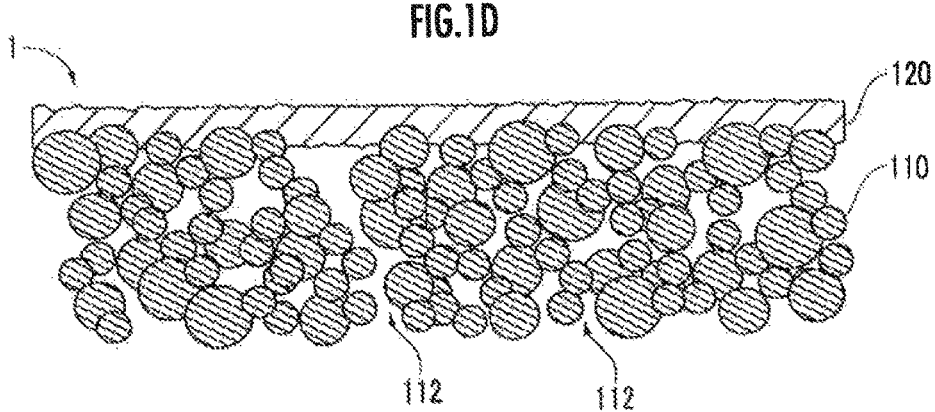
FIG. 1D is an explanatory diagram relating to a step of preparing a dense body.

As shown in FIG. 1D, a solid electrolyte body 1 produced by a method as one embodiment of the present invention comprises a flat plate-like porous body 110 and a dense body 120 containing a thin membrane-shaped solid electrolyte that is closely adhered to one main surface of the porous body 110.

The porous body 110 is composed of a first ceramic of a non-lithium ion electrolyte or an electrolyte that does not contain lithium ion, and has a plurality of open pores 112 that form passaging communicating from one main surface to the other main surface. As shown, the particles of the first ceramic in the porous body 110 have different sizes, of which some are larger than others and some are smaller than others, and the different size particles are distributed throughout the porous body from the one main surface to the other main surface. The thickness of the porous body 110 is, for example, in the range of 100 μm to 1 mm or in the range of 100 μm to 500 μm. The porosity of the porous body 110 is, for example, in the range of 10 to 70 vol. % or in the range of 20 to 50 vol. %. The porosity is measured by a mercury porosimetry method. For example, partially stabilized zirconia is used as the first ceramic of the non-lithium ion electrolyte.

The first ceramic may contain a lithium ion solid electrolyte. The solid electrolyte is, for example, a solid electrolyte including lithium as a mobile ion, such as a lithium ion conductive glass-like solid electrolyte of $Li_3PO_4$, LiPON in which nitrogen is mixed in $Li_3PO_4$, $Li_2S$—$SiS_2$, $Li_2S$—$P_2S_5$, $Li_2S$—$B_2S_3$ and the like, or a lithium ion conductive glass-like solid electrolyte in which a lithium halide such as LiI or a lithium oxyacid salt such as $Li_3PO_4$ is doped in those glasses. For example, a titanium oxide type solid electrolyte including lithium, titanium, and oxygen, such as $Li_xLa_yTiO_3$ ($0<x<1$, $0<y<1$ (for example, x=0.35, y=0.55)), phosphoric acid compounds, $Li_{1+x}Al_xTi_{2-x}(PO_4)_3$, exhibits stable performance even when fired in an oxygen atmosphere.

The dense body 120 is formed from a second ceramic containing the above-described solid electrolyte. There is no limitation on the thickness of the dense body 120, but the thickness is, for example, in the range of 0.5 μm to 100 μm. The solid electrolyte contained in the first ceramic and the solid electrolyte contained in the second ceramic may be the same or different.

(Method for Producing Solid Electrolyte Body)

A method for producing the solid electrolyte body as one embodiment of the present invention includes (S1) a step of preparing a first molded body, (S2) a step of preparing a porous body, (S3) a step of preparing a second molded body, and (S4) a step of preparing a dense body.

In step (S1), a first molded body 11 is prepared from a material including the first ceramic (see FIG. 1A). As the method for preparing the first molded body 11, for example, a sheet molding method or a roll compaction method is employed. For example, a binder such as butyral resin is mixed to prepare a paste, and the first molded body 11 is prepared by the method described above.

A pore-forming agent such as starch or carbon may be added to the first ceramics in order to adjust the porosity and the pore size of the porous body 110. When the first molded body 11 is fired, the pore-forming agent disappears and the open pores 112 are formed. The thickness of the porous body 110 obtained by firing is, for example, in the range of 100 μm to 1 mm or in the range of 100 μm to 500 μm.

In step (S2), the porous body 110 is prepared by firing the first molded body 11 in a first temperature range (see FIG. 1B). A plurality of open pores 112 that three-dimensionally communicate from one main surface of the porous body 110 to the other main surface are formed from the traces of the binder, the pore-forming agent included in the raw material being removed by decomposition, and the like. The first temperature range is set according to the type of the first ceramic, the binder, the pore forming agent, and the like, but is, for example, in the range of 800 to 1500° C. or in the range of 1000 to 1300° C. As will be described later, in step (S4), the porous body 110 is exposed to the temperature environment included in the second temperature range, and therefore it is preferable to control the firing time to be, for example, in the range of 1 to 5 hours, and, for example, in the range of 2 to 3 hours, in order to avoid an excessive reduction in porosity due to over-firing of the porous body 110.

In step (S3), a thin membrane-shaped second molded body 12 composed of a material including a second ceramic is prepared on one main surface of the porous body 110 (see FIG. 1C). As the method for preparing the second molded body 12, for example, a coating method such as a slurry printing method, a CVD method, a sputtering method, or an aerosol deposition method is employed. The thickness of the second molded body 12 is not limited, but is in the range of, for example, 0.5 μm to 100 μm, or in the range of 5 μm to 30 μm.

In step (S4), the dense body 120 is prepared on one main surface of the porous body 110 by firing the second molded body 12 in a second temperature range (see FIG. 1D). The second temperature range is, for example, in the range of 900 to 1500° C. or in the range of 1000 to 1300° C. When the first ceramic and the second ceramic are the same, necking of the first ceramic and the second ceramic tends to occur at the connection interface between the porous body 110 and the dense body 120, so that the joining strength between the porous body 110 and the dense body 120 is improved. To avoid an excessive reduction in the porosity due to overfiring of the porous body 110, the firing time is preferably controlled to be in the range of, for example, 1 to 5 hours, and for example, in the range of 2 to 3 hours.

As shown in FIG. 1D, after carrying out steps (S1) to (S4), a solid electrolyte body 1 is produced having the porous body 110 and the dense body 120, which is integrally formed with the porous body 110 on one main surface of the porous body 110.

(Structure of all-Solid State Battery)

Figure 2A:
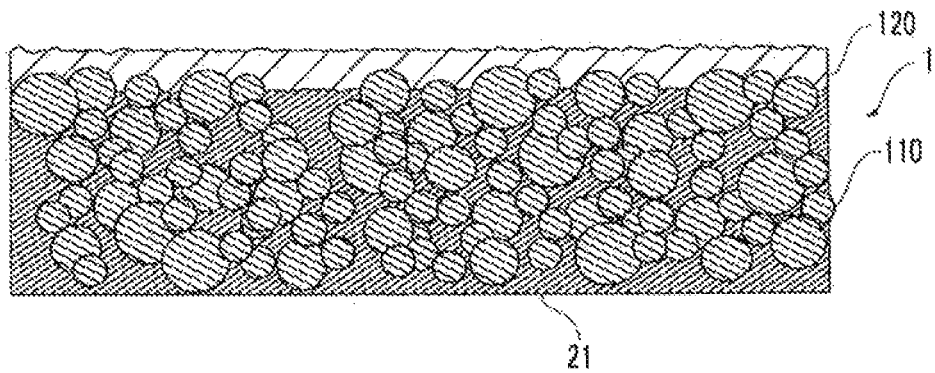
FIG. 2A is an explanatory diagram relating to a step of preparing a first electrode.
Figure 2B:
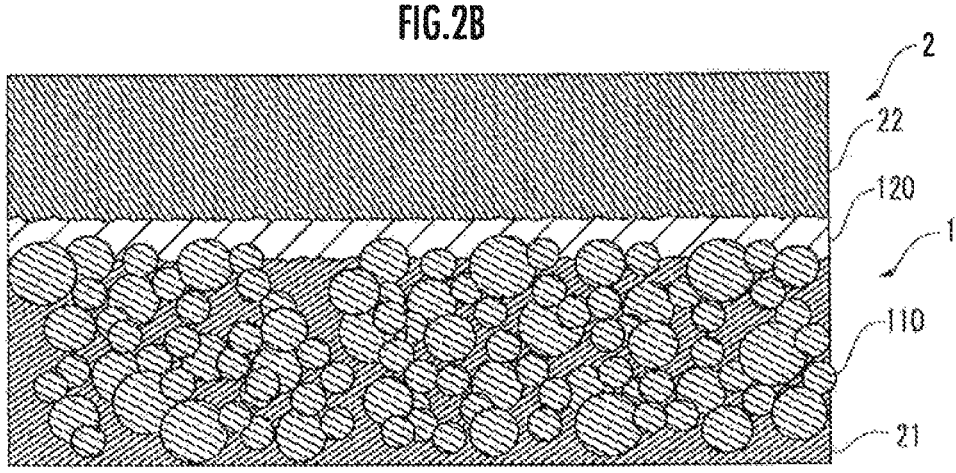
FIG. 2B is an explanatory diagram relating to a step of preparing a second electrode.
Figure 2C:
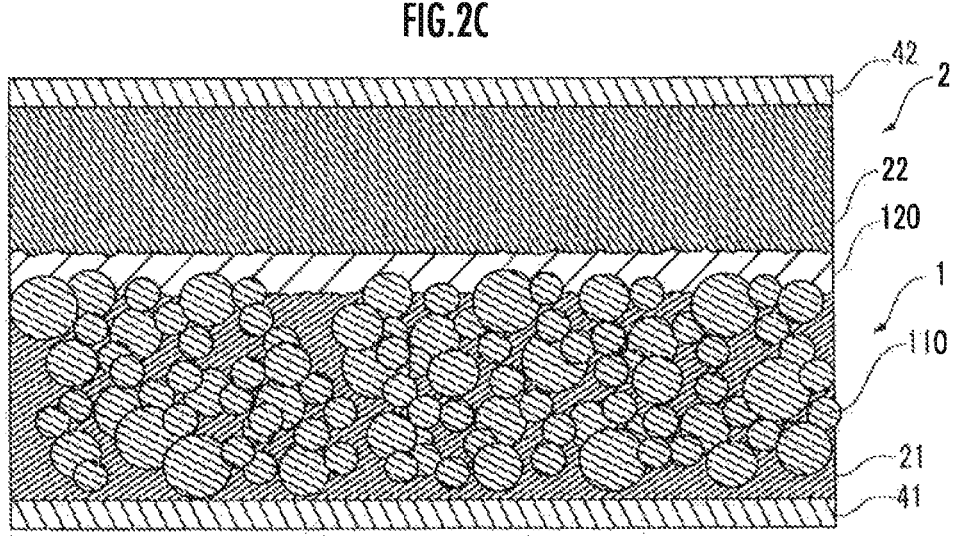
FIG. 2C is an explanatory diagram relating to a step of joining electrodes and current collectors.

As an embodiment of the present invention, an all-solid state battery 2 produced by the present method comprises, as shown in FIG. 2C, the solid electrolyte body 1 shown in FIG. 1D, a first electrode 21, a second electrode 22, a first electrode current collector 41 electrically connected to the first electrode 21, and a second electrode current collector 42 electrically connected to the second electrode 22.

The first electrode 21 is formed from the active material filling the open pores 112 of the porous body 110 forming the solid electrolyte body 1. When the first electrode 21 is a positive electrode, examples of active materials (positive electrode active materials) that may be employed include manganese dioxide ($MnO_2$), iron oxide, copper oxide, nickel oxide, lithium-manganese composite oxides (for example, $Li_xMn_2O_4$ or $Li_xMnO_2$) (for example, $1<x<5$ (the same applies below)), lithium-nickel composite oxides (for example, $Li_xNiO_2$), lithium-cobalt composite oxides (for example, $Li_xCoO_2$), lithium-nickel cobalt composite oxides (for example, $LiNi_{1-y}Co_yO_2$) (for example, $0<y<1$ (the same applies below)), lithium-manganese cobalt composite oxides (for example, $LiMn_yCo_{1-y}O_2$), spinel type lithium-manganese nickel composite oxides (for example, $Li_xMn_{2-y}Ni_yO_4$), lithium-phosphate compounds having an olivine structure (for example, $Li_xFePO_4$, $Li_xFe_{1-y}Mn_yPO_4$, $Li_xCoPO_4$, lithium-phosphate compounds having a NASICON structure (for example, $Li_xV_2(PO_4)_3$), iron sulfate ($Fe_2(SO_4)_3$), vanadium oxides (for example, $V_2O_5$), and the like. An electron conduction aid such as acetylene black, carbon black, graphite, various carbon fibers, or carbon nanotubes may be added to the positive electrode active material.

When the first electrode 21 is a negative electrode, examples of active materials (negative electrode active materials) that may be employed include carbon, metal lithium (Li), metal compounds, metal oxides, Li metal compounds, Li metal oxides (including lithium-transition metal composite oxides), boron-added carbon, graphite, compounds having a NASICON structure, and the like.

Examples of the carbon that may be employed include conventionally known carbon materials, such as graphite carbon, hard carbon, and soft carbon. Examples of the metal compound that may be employed include LiAl, LiZn, $Li_3Bi$, $Li_3Cd$, $Li_3Sd$, $Li_4Si$, $Li_{4.4}Pb$, $Li_{4.4}Sn$, $Li_{0.17}C$ ($LiC_6$), and the like. Examples of the metal oxide that may be employed include SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, $TiO_2$, FeO, and the like. Examples of the Li metal compound may include $Li_3FeN_2$, $Li_{2.6}Co_{0.4}N$, $Li_{2.6}Cu_{0.4}N$, and the like. Examples of the Li metal oxide (lithium-transition metal composite oxide) may include a lithium-titanium composite oxide represented by $Li_4Ti_5O_{12}$. Examples of the boron-added carbon may include boron-added carbon and boron-added graphite. The conductive auxiliary materials described above in relation to the positive electrode active material may be added to the negative electrode active material.

The second electrode 22 is formed by molding an electrode material including the active material into a thin membrane shape or a sheet shape having a predetermined thickness.

Examples of the material forming the first electrode current collector 41 and the second electrode current collector 42 include general electron-conductive metal materials such as platinum (Pt), platinum (Pt)/palladium (Pd), gold (Au), silver (Ag), aluminum (Al), copper (Cu), ITO (indium-tin oxide film), and SUS plate.

(Method for Producing all-Solid State Battery)

The method for producing an all-solid state battery as one embodiment of the present invention includes, in addition to steps (S1) to (S4) of the method for producing a solid electrolyte body as one embodiment of the present invention, a step (S5) of filling the open pores 112 of the porous body 110 with an active material, a step (S6) of firing the active material to form the first electrode 21, a step (S7) of forming the second electrode 22, a step (S8) of connecting the first electrode current collector 41 to the first electrode 21, and a step (S9) of connecting the second electrode current collector 42 to the second electrode 22. The description of steps (S1) to (S4) will be omitted here.

In step (S5), the open pores 112 of the porous body 110 forming the solid electrolyte body 1 are filled with the active material. Examples of active materials that may be used include an active material such as positive electrode active material or a negative electrode active material that has been atomized and formed into a colloidal dispersion solution by using an organic solvent, an aqueous solvent, pure water, or the like, a solution in which the active material has been formed as a sol, and the like. The filling of the open pores 112 of the porous body 110 with the active material is performed by, for example, dropping or dipping a sol-like active material on the surface of the porous body 110 in air, an Ar atmosphere, or a vacuum. If the open pores 112 of the porous body 110 are not sufficiently filled with the active material, the filling operation is repeated a plurality of times.

In step (S6), the active material is fired as necessary to form the first electrode 21 (see FIG. 2A). The firing temperature when firing the active material is controlled so as to be in the range of, for example, 700 to 1100° C. However, when an electron conduction aid such as carbon is added, firing is not preferable, and step (S6) is omitted.

In step (S7), the second electrode 22 is formed by, for example, a coating method such as a slurry printing method or a roll coater method, and then, similar to as described above, fired as necessary to prepare the second electrode 22. The second electrode 22 may be formed by a sputtering method, a resistance heating deposition method, an ion beam deposition method, an electron beam deposition method, and the like.

In step (S8), the first electrode current collector 41 is formed in a state of being connected to the first electrode 21 by a method such as a sputtering method, an ion beam deposition method, or an electron beam deposition method (see FIG. 2C). In step (S9), the second electrode current collector 42 is formed in a state of being connected to the second electrode 22 by a method such as a sputtering method, an ion beam deposition method, or an electron beam deposition method (see FIG. 2C). Note that steps (S8) and (S9) may be omitted.

After steps (S1) to (S9) or steps (S1) to (S5) and (S7) to (S9), as shown in FIG. 2C, the porous body 110 and an all-solid state battery 2 including the dense body 120 integrally formed with the porous body 110 on one of the main surfaces of the porous body 110, the first electrode 21 having at least a part thereof formed from an active material filling the open pores 112 of the porous body 110, the second electrode 22 formed on the other main surface of the dense body 120, the first electrode current collector 41 electrically connected to the first electrode 21, and the second electrode current collector 42 electrically connected to the second electrode 22, is produced.

(Effects)

According to the method of the present invention, the thin membrane-shaped second molded body 12 is formed on at least a part of the surface of the porous body 110 prepared in advance, and the thin membrane-shaped dense body 120 is prepared by firing the second molded body 12 (see FIGS. 1C and 1D). Therefore, the solid electrolyte body 1 and the all-solid state battery 2 can be produced while facilitating the preparation of the thin dense body 120.

(Other Embodiments of the Present Invention)

Figure 3A:
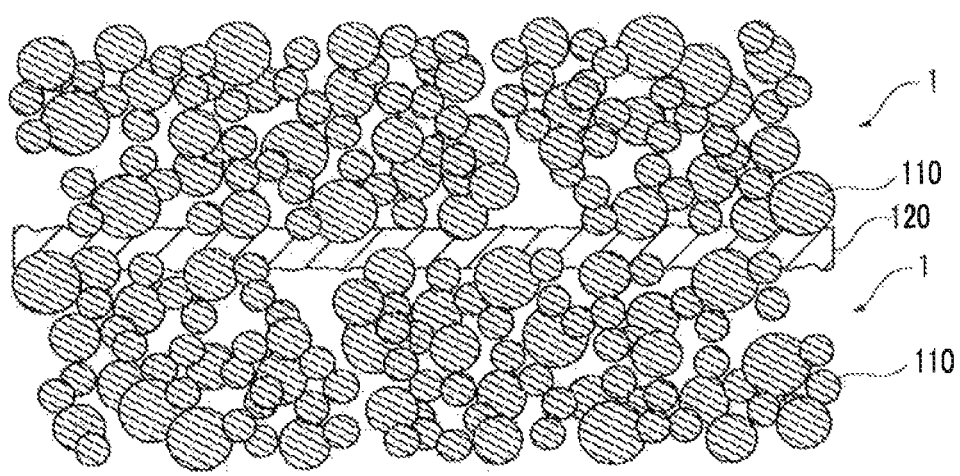
FIG. 3A is an explanatory diagram relating to a structure of a solid electrolyte body according to another embodiment.

As shown in FIG. 3A, the solid electrolyte body 1 may be produced having a pair of the porous bodies 110 and the dense body 120 sandwiched by the pair of porous bodies 110. For example, after preparing a pair of porous bodies 110, the second molded body 12 is prepared on one main surface of one of the porous bodies 110 (see FIG. 1C). After that, one main surface of the other porous body 110 is brought into contact with the second molded body 12 to produce the second molded body 12 sandwiched by the pair of porous bodies 110, which is then fired to produce the solid electrolyte shown in FIG. 3A.

Figure 3B:
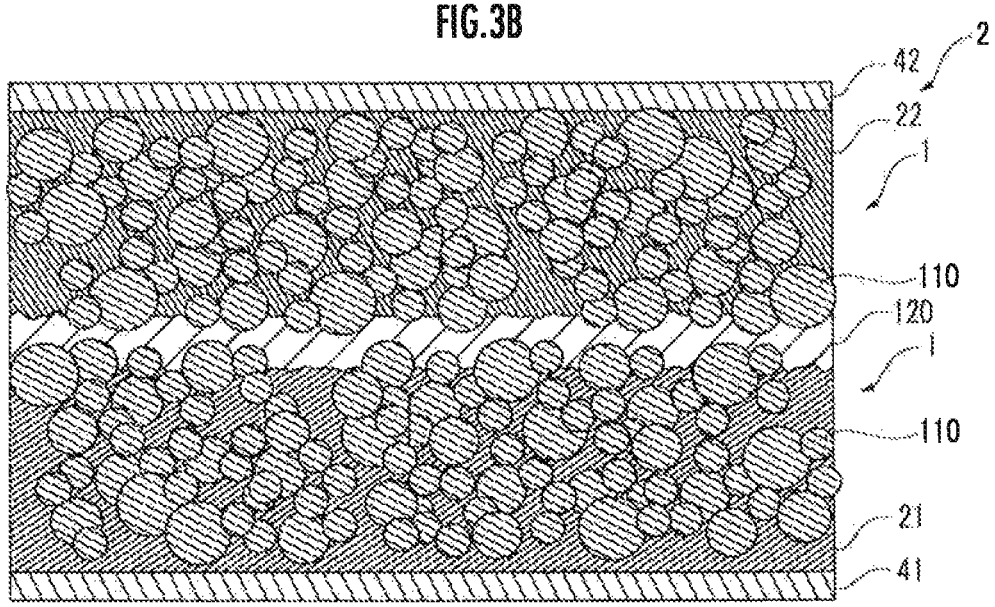
FIG. 3B is an explanatory diagram relating to a structure of an all-solid state battery according to another embodiment.

Using the solid electrolyte body 1 shown in FIG. 3A, the all-solid state battery 2 shown in FIG. 3B may also be produced by performing steps (S5), (S6), (S8), and (S9) or steps (S5), (S8), and (S9). In this case as well, steps (S8) and (S9) may be omitted.

REFERENCE SIGNS LIST 1 solid electrolyte body
2 all-solid state battery
11 first molded body
12 second molded body
21 first electrode
22 second electrode
41 first electrode current collector
42 second electrode current collector 110 porous body
112 open pore
120 dense body.

The invention claimed is:

1. A method for producing a solid electrolyte body which includes a porous body composed of a first ceramic containing an electrolyte that does not contain lithium ion and a thin membrane-shaped dense body composed of a second ceramic containing a lithium ion solid electrolyte and integrally formed with at least a part of a surface of the porous body, wherein the method comprises:
a step of preparing the porous body by preparing a first molded body and firing the first molded body; and
a step of preparing a thin membrane-shaped second molded body of the ceramics on at least a part of the surface of the porous body, and preparing the thin membrane-shaped dense body by firing the second molded body,
wherein the porous body includes larger structural particles of the first ceramic and smaller structural particles of the first ceramic dispersed throughout the porous body in a thickness direction and plane direction;
some of the larger structure particles of the first ceramic and some of the smaller structure particles of the first ceramic of which the porous body is composed are partially embedded in the thin membrane-shaped dense body over an entire bonding interface between the dense body and said at least part of the surface of the porous body with which the dense body is integrally formed, and
the first ceramic and the second ceramic are the same.

2. A method for producing an all-solid state battery, the method comprising:
a step of producing a solid electrolyte body by the method for producing a solid electrolyte body according to claim 1; and
a step of filling open pores of the porous body forming the solid electrolyte body with an active material.

3. A solid electrolyte body for a lithium ion solid battery produced according to the method of claim 1.

4. An all-solid state battery produced according to the method of claim 2.

5. The all-solid state battery according to claim 4, wherein the second electrode is formed from a porous body composed of the first ceramic and an active material filling open pores of the porous body.

6. The solid electrolyte body for a lithium ion solid battery according to claim 3, wherein the thin membrane-shaped dense body has a thickness in a range of 0.5 μm to 100 μm.

7. The all-solid state battery according to claim 4, wherein the thin membrane-shaped dense body has a thickness in a range of 0.5 μm to 100 μm.

8. The solid electrolyte body produced according to the method of claim 1, advance and composed of a first ceramic of a non-lithium ion electrolyte; and a thin membrane-shaped dense body composed of a second ceramic containing a solid electrolyte and integrally formed with at least a part of a surface of the porous body which has been prepared in advance,
wherein the first ceramic is partially stabilized zirconia.

9. The solid electrolyte body according to claim 2, wherein the first ceramic is partially stabilized zirconia.

* * * * *